United States Patent
Yiwen et al.

(10) Patent No.: US 6,983,019 B2
(45) Date of Patent: Jan. 3, 2006

(54) APPARATUS AND METHOD FOR CONVERTING SIGNALS

(75) Inventors: Zhu Yiwen, Kanagawa (JP); Yoichi Yagasaki, Tokyo (JP); Takefumi Nagumo, Tokyo (JP); Kuniaki Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 654 days.

(21) Appl. No.: 09/791,013

(22) Filed: Feb. 22, 2001

(65) Prior Publication Data

US 2002/0001348 A1 Jan. 3, 2002

(30) Foreign Application Priority Data

Feb. 22, 2000 (JP) .......................... P2000-050524

(51) Int. Cl.
*H04N 7/12* (2006.01)
(52) U.S. Cl. .................. 375/240.16; 382/236; 348/451
(58) Field of Classification Search ........... 375/240.16, 375/240.26, 240.02, 240.04, 240.12, 240; 348/459, 451, 452, 413.1, 406.1; 382/243, 382/236
See application file for complete search history.

(56) References Cited

U.S. PATENT DOCUMENTS

| | | | |
|---|---|---|---|
| 5,796,439 A | * | 8/1998 | Hewett et al. .............. 348/459 |
| 5,805,222 A | * | 9/1998 | Nakagawa et al. .... 375/240.12 |
| 6,067,320 A | * | 5/2000 | Takahashi et al. ..... 375/240.12 |
| 6,078,617 A | * | 6/2000 | Nakagawa et al. ......... 375/240 |
| 6,222,887 B1 | * | 4/2001 | Nishikawa et al. .... 375/240.26 |
| 6,393,059 B1 | * | 5/2002 | Sugiyama .............. 375/240.02 |
| 6,507,615 B1 | * | 1/2003 | Tsujii et al. ........... 375/240.04 |
| 6,584,154 B1 | * | 6/2003 | Wu ....................... 375/240.16 |
| 6,614,846 B1 | * | 9/2003 | Fujiwara et al. ....... 375/240.16 |

* cited by examiner

*Primary Examiner*—Gims Philippe
(74) *Attorney, Agent, or Firm*—Spnnenschein, Nath & Rosenthal LLP

(57) ABSTRACT

An image-coding format converting apparatus comprising an EMPEG2 image decoder 30, a resolution/frame rate converter 31, a motion vector converter 32, and an MPEG4 encoder 33. The EMPEG2 decoder 30 decodes a bit stream of EMPEG2 image codes, generating an image signal. The resolution/frame rate converter 31 converts the image signal. The MPEG4 encoder 33 encodes the output of the resolution/frame rate converter 31, generating a bit stream of MPEG4 image codes. In the resolution/frame rate converter 31, pixels are added or extracted in accordance with the start position of a macro block, thus adjusting the input image signal to one than can easily be encoded to MPEG4 image codes. The motion vector converter 32 generates an MPEG4 motion vector from parameters such as an MPEG2 motion vector. The MPEG4 encoder 33 uses the MPEG4 motion vector to encode the output of the resolution/frame rate converter 31.

2 Claims, 16 Drawing Sheets

APPARATUS AND METHOD FOR CONVERTING SIGNALS

RELATED APPLICATION DATA

The present application claims priority to Japanese Application No. P2000-050524 filed Feb. 22, 2000, which application is incorporated herein by reference to the extent permitted by law.

BACKGROUND OF THE INVENTION

The present invention relates to an apparatus and method for converting signals. More particularly, the invention relates to the technique of converting a signal encoded in the first format, into a signal encoded in the second format.

FIG. 1 shows a conventional apparatus for converting an image-coding format. The apparatus is designed to convert an input bit stream of image codes into a bit stream of a different image-coding format. More specifically, the image-coding format converting apparatus of in FIG. 1 converts an input bit stream of MPEG2 (Moving Picture image coding Experts Group: ISO/IEC13818-2) image codes, into a bit stream of MPEG4 (ISO/IEC14496-2) image codes.

In the image-coding format converting apparatus shown in FIG. 1, an input bit stream of MPEG2 image codes is supplied to the MPEG2 image decoder 210.

The MPEG2 image decoder 210 decodes the input bit stream of MPEG2 image codes, in accordance with the MPEG2 image-decoding scheme, thus generating an image signal. The image signal is input to the resolution/frame rate converter 211.

The resolution/frame rate converter 211 converts the image signal to an image signal that has different resolution and frame rate. The signal the converter 211 has generated is supplied to an MPEG4 image encoder 212. It should be noted that the converter 211 reduces the resolution of the decoded image signal to half the original value in both the vertical direction and the horizontal direction.

The MPEG4 image encoder 212 encodes the image signal supplied from the resolution/frame rate converter 211, in accordance with the MPEG4 image-encoding scheme, thereby generating an MPEG4-encoded bit stream. The MPEG4-encoded bit stream is output from the image-coding format converting apparatus of FIG. 1.

The MPEG4 image encoder 212 detects a motion vector from the image signal generated by the MPEG2 image decoder 210 and predict a motion from the motion vector, in the same way as in the ordinary encoding process.

The amount of data processed to detect the motion vector in the course of encoding the input image signal occupies about 60 to 70% of all data processed in the conventional method of converting an image-coding format. Consequently, it is difficult to process the image signal in real time. This will inevitably result in a time delay. Further, the image-coding format converting apparatus needs to be large and complex.

In the image-coding format converting apparatus described above, the resolution/frame rate converter 211 changes the resolution and frame rate of the image signal that the MPEG2 image decoder 210 has generated by decoding the bit stream of MPEG2 image codes in accordance with the MPEG2 image-decoding scheme. Then, the MPEG4 image encoder 212 encodes the image signal thus processed by the converter 211, in accordance with the MPEG4 image-encoding scheme, and generates an MPEG4-encoded bit stream.

Therefore, the resolution and frame rate of the image signal output from the resolution/frame rate converter 211 may not be appropriate, making it difficult for the MPEG4 image encoder 212 to perform MPEG4 image encoding correctly.

BRIEF SUMMARY OF THE INVENTION

The present invention has been made in view of the above. An object of the invention is to provide an apparatus and method for converting signals, in which at least a resolution-converting process is performed on a signal encoded in the first format, such as a bit stream of MPEG2 image codes, thereby generating a second signal, and a third signal, such as a bit stream of MPEG2 image codes, is generated from the second signal. The third signal thus generated preserves the quality of the first signal. The third signal can be generated by processing a small amount of data. The apparatus can therefore be relatively small and simple in structure.

An apparatus according to the invention converts a first encoded image signal to a second encoded image signal. The apparatus comprises: signal-decoding means for decoding the first encoded image signal, thereby outputting an image signal and a first motion vector used in decoding the first encoded image signal; signal-converting means for converting the image signal to a second image signal; motion-vector converting means for converting the first motion vector for the second image signal, thereby outputting a second motion vector; and signal-encoding means for encoding the second image signal into the second encoded image signal, by using the second motion vector.

An apparatus and a method according to the invention performs at least resolution conversion on a first signal, thereby generating a second signal, and for generating a third signal from the second signal. This apparatus comprises: parameter-converting means for converting process parameters contained in the first signal to all or some of parameters that are required to generate the third signal from the second signal; and signal-generating means for generating the third signal from the second signal by using the parameters generated by the parameter-converting means. The apparatus can therefore achieve the object of the invention.

A method according to this invention converts a first encoded image signal to a second encoded image signal. The method comprises the steps of: decoding the first encoded image signal, thereby outputting an image signal and a first motion vector used in decoding the first encoded image signal; converting the image signal to a second image signal; converting the first motion vector for the second image signal, thereby outputting a second motion vector; and encoding the second image signal into the second encoded image signal, by using the second motion vector.

A method according to the present invention performs at least resolution conversion on a first signal, thereby generating a second signal, and for generating a third signal from the second signal. The method comprises the steps of: converting process parameters contained in the first signal to all or some of parameters that are required to generate the third signal from the second signal; and generating the third signal from the second signal by using the parameters generated in the step of converting the process parameters.

In the apparatus according to the present invention, at least resolution conversion is performed on a first signal, thereby generating a second signal, and a third signal is generated from the second signal. The process parameters contained in the first signal are converted to all or some of the parameters that are required to generate the third signal. Hence, the amount of data that should be processed to generate the third signal from the second signal can be reduced, without deteriorating the quality of the third signal. This prevents the apparatus from becoming large and complex.

DETAILED DESCRIPTION OF THE INVENTION

Embodiments of the present invention will be described, with reference to the accompanying drawings.

Figure 1:
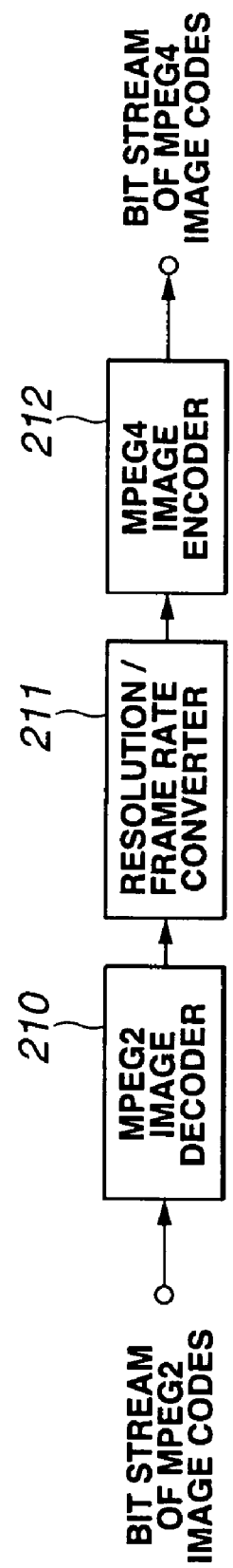
FIG. 1 is a block diagram showing a conventional apparatus for converting an image-coding format.
Figure 2:
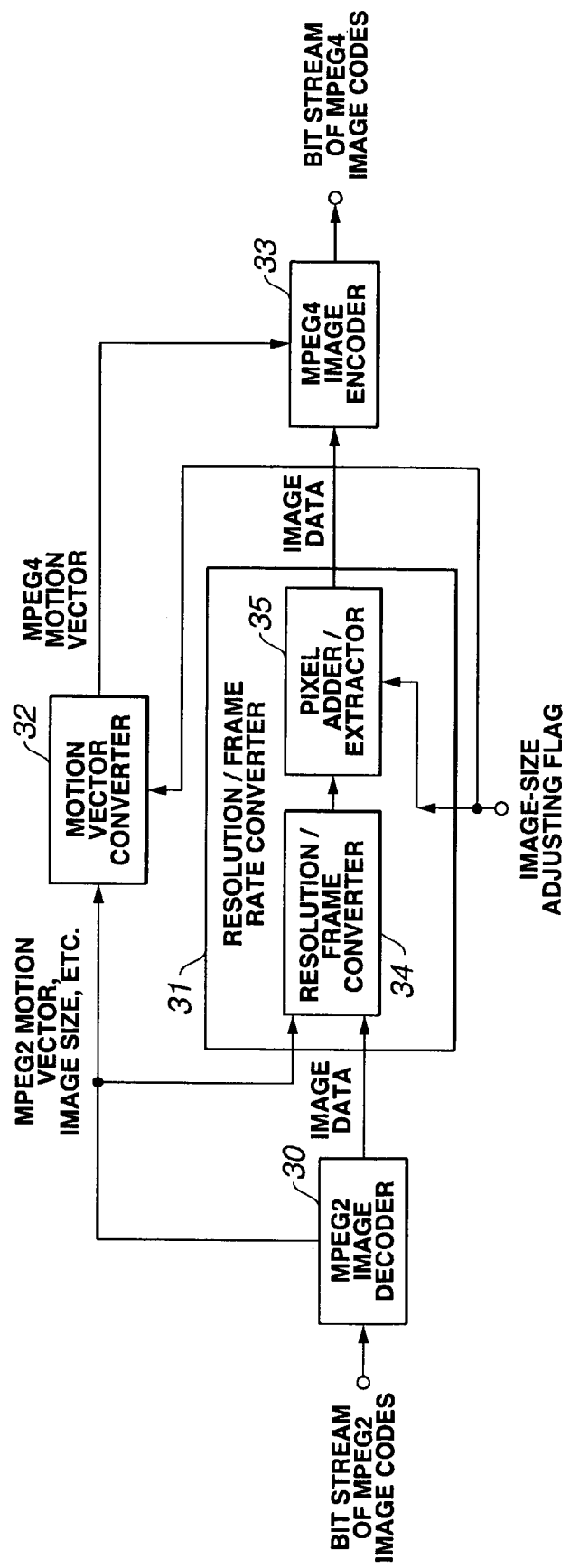
FIG. 2 is a block diagram illustrating an apparatus for converting an image-coding format, which is the first embodiment of the present invention.

FIG. 2 shows an apparatus for converting an image-coding format, which is the first embodiment of the invention.

In the apparatus shown in FIG. 2, an input bit stream of MPEG2 image codes is supplied to the MPEG2 image decoder 30.

The MPEG2 image decoder 30 decodes the bit stream in accordance with the MPEG2 image-decoding scheme, thus generating an image signal. The image signal (an interlace image signal) is input to the resolution/frame rate converter 31.

The resolution/frame rate converter 31 converts the image signal to an image signal that has a given resolution and a given frame rate. The converter 31 adjusts the resolution of the image signal in accordance with an image-size adjusting flag supplied from an external device. Thus, the section 31 outputs an image signal having such a resolution that the image signal may be converted into an MPEG4 image signal. The image signal the resolution/frame rate converter 211 has generated is supplied to the MPEG4 image encoder 33.

The MPEG4 image encoder 33 encodes the image signal supplied from the resolution/frame rate converter 31, thereby generating an MPEG4-encoded bit stream. The MPEG4-encoded bit stream is output from the image-coding format converting apparatus (FIG. 2).

This is how the apparatus shown in FIG. 2 operates. The image-coding format converting apparatus operates, utilizing the fact that the motion vector of an image greatly changes in terms magnitude and direction after the image is subjected to resolution/frame rate conversion. That is, the motion vector of MPEG2 system (hereinafter referred to as "MPEG2 motion vector"), which the MPEG2 image decoder 30 uses to decode the input bit stream, is converted to a motion vector of MPEG4 system (hereinafter referred to as "MPEG4 motion vector"). The MPEG4 motion vector, thus acquired, is supplied to the MPEG4 image encoder 33. Using the MPEG4 motion vector, the MPEG4 image encoder 33 encodes the image signal supplied from the resolution/frame rate converter 31. It is therefore unnecessary for the encoder 33 to detect motion vectors.

More specifically, the image-coding format converting apparatus comprises a motion vector converter 32. The motion vector converter 32 receives the MPEG2 motion vector the MPEG2 image decoder 30 has used to decode the input bit stream. The converter 32 converts the MPEG2 motion vector to an MPEG4 motion vector, which is supplied to the MPEG4 image encoder 33. The MPEG4 image encoder 33 uses the MPEG4 motion vector, thereby encoding the image signal generated by the resolution/frame rate converter 31.

As described above, the MPEG4 image encoder 33 need not detect motion vectors in the image-coding format converting apparatus according to the present invention. This reduces the amount of data the apparatus must process and prevents the apparatus from becoming large or complex. Since the apparatus needs only to process a small amount of data, the time delay is small enough to achieve real-time processing of image data.

In the present embodiment, or image-coding format converting apparatus, not only the motion vector, but also parameters such as the image size and macro-block type, both the MPEG2 decoder 30 uses to decode the input bit stream, or the parameters obtained after the resolution and frame rate are converted, are applied in the MPEG4 encoder 33 to generate MPEG4 image codes. The amount of data that the MPEG4 image encoder 33 must process is thereby decreased. Hence, the encoding efficiency further can increase and the process time can reduce.

Figure 3B:
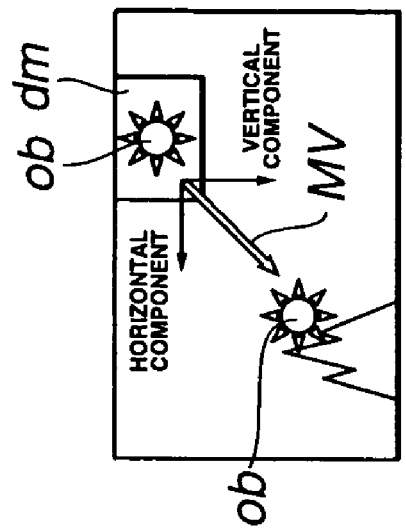
FIG. 3 is a diagram explaining the correlation between the motion vectors an image has before and after its resolution is changed.
Figure 3A:
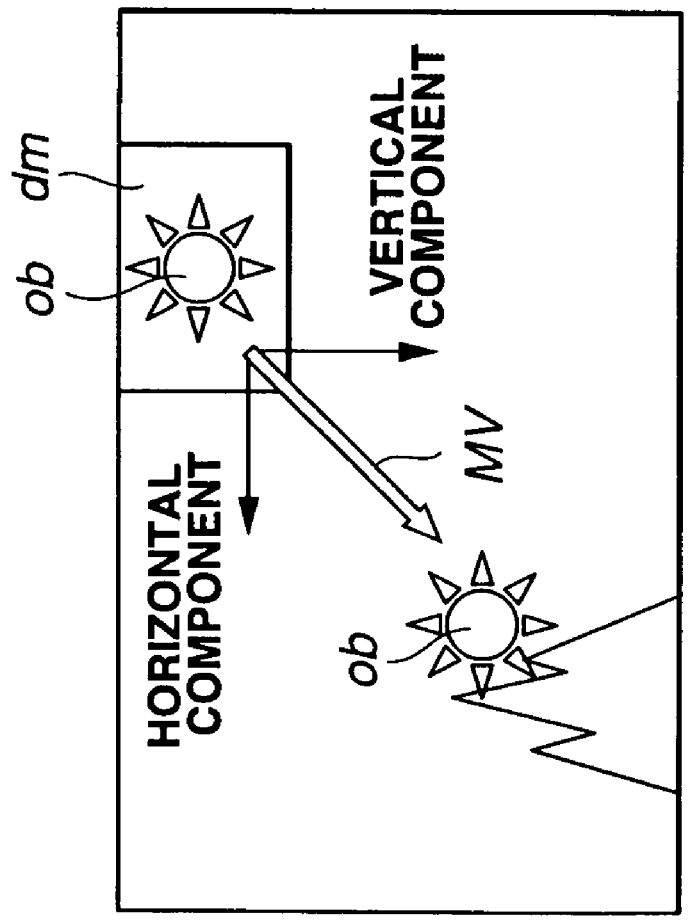

The correlation between the motion vectors an image has before and after its resolution is changed will be explained, with reference to FIG. 3. Shown in FIG. 3A is a frame image before the resolution conversion. Shown in FIG. 3B is the frame image after the resolution conversion. The region dm in each frame image indicates the position that the image of an object ob assumes in the frame image before the resolution conversion. The image of the object ob before the resolution conversion has a motion vector MV shown in FIG. 3A. The image of the object ob after the resolution conversion has a motion vector MV shown in FIG. 3B.

The horizontal component of the motion vector MV the image has after the resolution conversion can be obtained from two items of data, i.e., the horizontal component of the motion vector MV the image has before the resolution conversion, and the rate at which the resolution of the image has been converted in the horizontal direction. The vertical component of the motion vector MV the image has after the resolution conversion can be calculated from two items of data, too, i.e., the vertical component of the motion vector MV the image has before the resolution conversion, and the rate at which the resolution of the image has been converted in the vertical direction. Namely, the motion vector MV after the resolution conversion is correlated with the motion vector MV before the resolution conversion are related. Only if this correlation is utilized, the vector MV after the resolution conversion can be determined from the vector MV before the resolution conversion.

Thus, in the image-coding format converting apparatus of this invention, the motion vector of a macro-block of MPEG2 image codes contained in the input bit stream or the parameters such as the macro-block type, are supplied to the motion vector converter 32 in order to convert the input bit stream of MPEG2 image codes to a bit stream of MPEG4 image codes. The motion vector converter 32 converts the motion vector to an MPEG4 motion vector, or the parameters to parameters such as a macro-block type. The term "macro-block type" means a code that designates the encoding method for each macro-block.

Referring back to FIG. 2, the image-coding format converting apparatus of this invention will be described in detail.

The MPEG2 image decoder 30 decodes the variable-length MPEG2 image codes of the input bit stream, thereby generating an interlace image signal. The interlace image signal is supplied to the resolution/frame rate converter 31.

The resolution/frame rate converter 31 comprises a resolution/frame converter 34 and a pixel adder/extractor 35. The resolution/frame converter 34 performs resolution conversion and frame-rate conversion. The pixel adder/extractor 35 adds pixels to the image signal or extract pixels therefrom.

The resolution/frame converter 34 converts the resolution and frame rate of the interlace image signal supplied from the MPEG2 image decoder 30. In the present embodiment, the converter 34 reduces the resolution of the input signal to half, in both the vertical direction and the horizontal direction.

Figure 4:
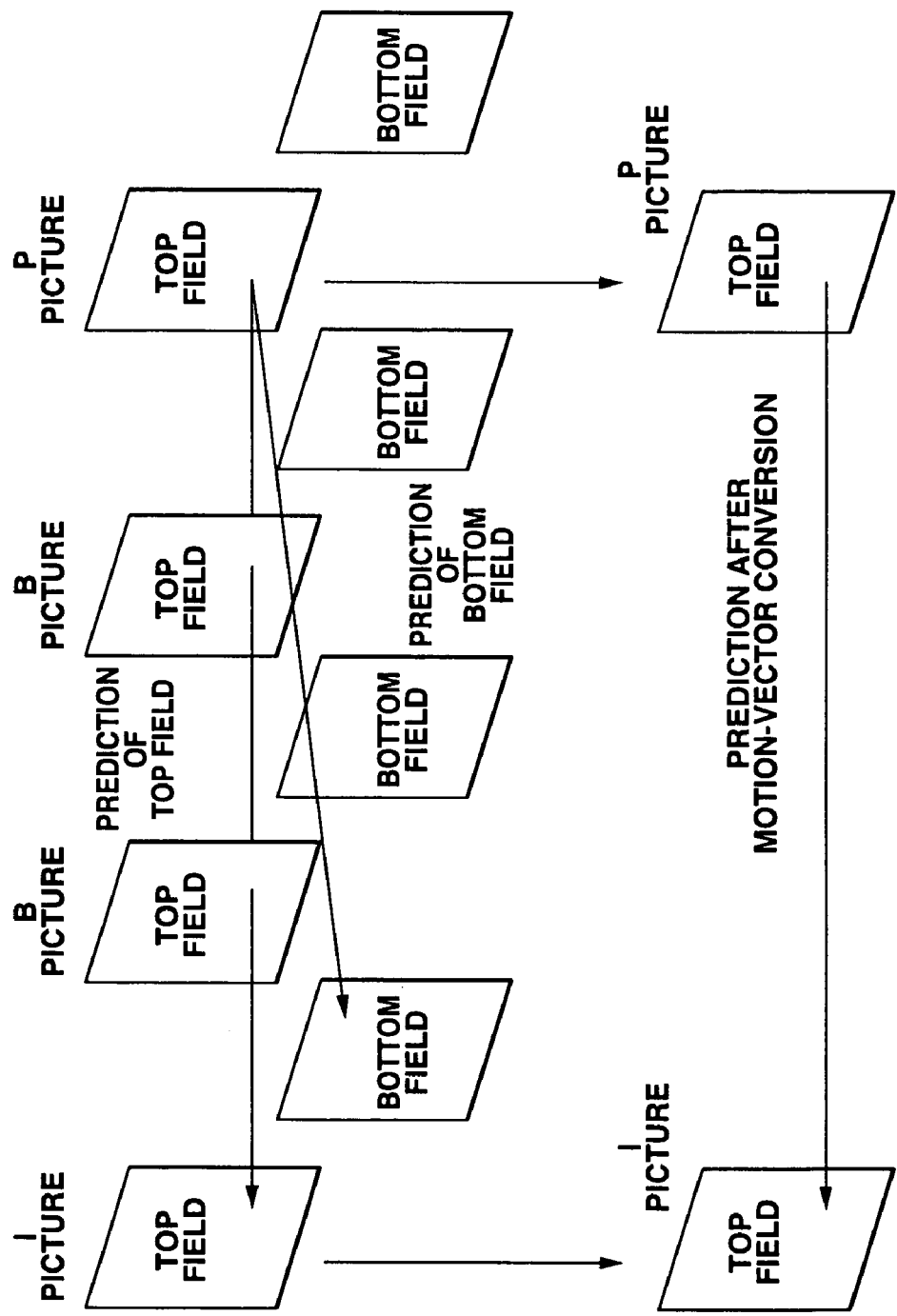
FIG. 4 is a diagram explaining how the resolution and frame rate of an image signal are converted.

More precisely, the resolution/frame converter 34 extracts either top fields or bottom fields from the input interlace image signal as is illustrated in FIG. 4, converting the image signal to a signal representing a progressive image. The resolution of the input image signal is thereby decreased in the horizontal direction, to half the original value. Further, the resolution/frame converter 34 converts the resolution of the input signal in the vertical direction, to half the original value, by using a down-sampling filter. To impart a low bit rate to the image signal, the resolution/frame converter 34 extracts an I picture (intra-image coded picture) and a P picture (forward prediction coded picture) from the image signal, leaving the B pictures (bi-direction prediction coded pictures). That is, the converter 34 compresses the image signal in the direction of time (thus, lowering the frame rate).

As shown in FIG. 4, the input interlace image is composed of top fields and bottom fields. Of these fields, only the top fields are extracted, forming a progressive image. The resolution of the image therefore decreases to half in the vertical direction. The progressive image constituted by top fields only is subjected to down sampling, thereby extracting only the I picture and the P picture. The frame rate is thereby reduced. The down sampling may be carried out after the reduction of the frame rate. That is, the resolution/frame converter 34 changes the resolution and frame rate of the input MPEG2 image signal composed of I, B, B, P, B, B, P, . . . pictures, thereby converting the input image signal to an image signal composed of I, P, P, P, P, . . . top fields only. The output of the resolution/frame converter 34 is supplied to the pixel adder/extractor 35.

The pixel adder/extractor 35 processes the image signal subjected to the resolution/frame rate conversion, so that the MPEG4 image encoder 33 may encode the image signal to a bit stream of MPEG4 image codes. To be more specific, the pixel adder/extractor 35 changes the input image data to one consisting of pixels that are arranged in rows and columns, either being a multiple of 16. To generate such image data, the pixel adder/extractor 35 adds pixels to, or extract pixels from, the input image signal, in accordance with an image-size adjusting flag supplied from the external device. The image-size adjusting flag is supplied from the external device to the resolution/frame rate converter 31. In the converter 31, the flag is input to the pixel adder/extractor 35. The flag causes the pixel adder/extractor 35 to add pixels to, or extract pixels from, the input image signal, if the pixels constituting the image signal are arranged in rows and columns, either not being a multiple of 16. Hence, if the image-size adjusting flag designates addition of pixels or extraction of pixels, the pixel adder/extractor 35 adds pixels to, or extracts pixels from, the image signal, changing the image signal to one that consists of pixels are arranged in rows and columns, either being a multiple of 16.

Figure 5:
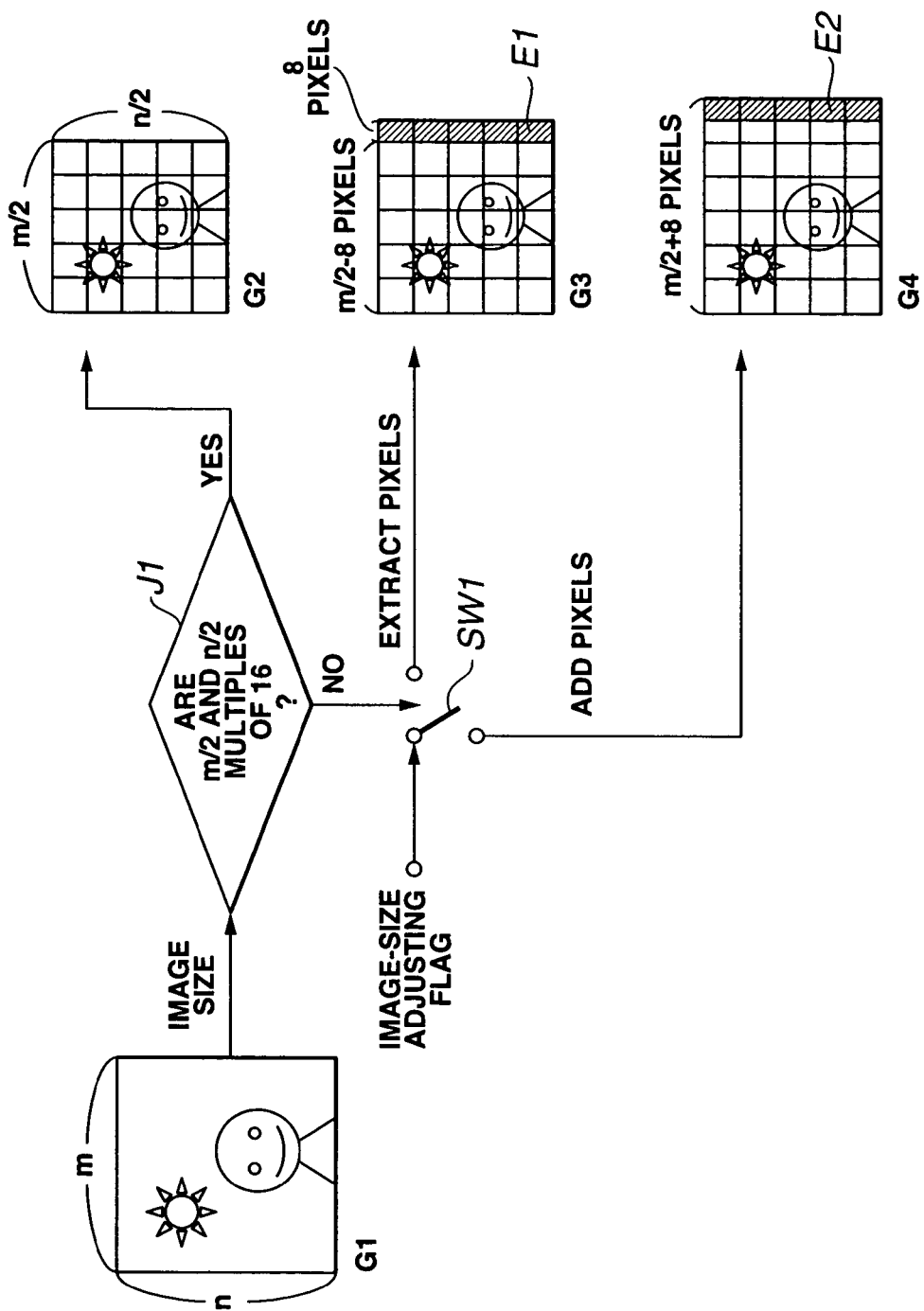
FIG. 5 is a diagram explaining how pixels are added or removed from an image in accordance with an image-size adjusting flag.

It will be described how the pixel adder/extractor 35 adds or extracts pixels in accordance with the image-size adjusting flag, with reference to FIG. 5.

Assume the image signal G1 output from the MPEG2 image decoder 30 consists of m×n pixels, where m and n are multiples of 16. The resolution/frame converter 34 reduces the resolution of the image signal to half, in both the vertical direction and the horizontal direction, thus generating an image signal G2. The image signal G2 therefore consists of m/2×n/2 pixels. When m/2 and n/2 are divided by 16, there may remain eight pixels.

If m/2 and n/2 are both multiples of 16, the image signal G2 represents an image that can be processed into a bit stream of MPEG4 image codes. In this case, the pixel adder/extractor 35 need not add pixels to or extract pixels from the image signal G2. If m/2 or n/2 is not a multiple of 16 (that is, if eight pixels remain when m/2 or n/2 is divided by 16), the image signal G2 represents an image that cannot be processed into a bit stream of MPEG4 image codes. If so, the pixel adder/extractor 35 needs to add pixels to or extract pixels from the image signal G2.

Therefore, the external device supplies the image-size adjusting flag to the pixel adder/extractor 35, selecting either addition of pixels or extraction of pixels (SW1). In the pixel adder/extractor 35 it is determined whether both m/2 and n/2 are multiples of 16 or not (Step J1). In accordance with the decision made, it is then determined whether the image-size adjusting flag should be used or not.

If NO in Step SJ1, that is, if it is determined that both m/2 and n/2 are not multiples of 16 and there remain eight pixels, after the resolution/frame converter 34 converted the image signal, and if the image-size adjusting flag input designates extraction of pixels, the pixel adder/extractor 35 extracts the remaining eight pixels that form a first or the last row or column. Thus, the pixel adder/extractor 35 generates an image signal G3 that consists of (m/2−8)×(n/2) pixels or (m/2)×(n/2−8) pixels.

If NO in Step SJ1, that is, if it is determined that both m/2 and n/2 are not multiples of 16 and there remain eight pixels, after the resolution/frame converter 34 converted the image signal, and if the image-size adjusting flag input designates addition of pixels, the pixel adder/extractor 35 copies eight pixels copied from the original image data and adds the copied pixels to a first or the last row or column. In this case, the pixel adder/extractor 35 generates an image signal 4 that consists of (m/2+8)×(n/2) pixels or (m/2)×(n/2+8) pixels.

No matter whether pixels are extracted from or added to the image signal, the pixel adder/extractor 35 outputs an image signal representing an image that consists of m×n pixels, where m and n are both multiples of 16. The image signal G4 represents an image that can be encoded into a bit stream of MPEG4 image codes.

The image signal, which the resolution/frame rate converter 31 has generated by performing resolution conversion and pixel addition or extraction, is input to the MPEG4 image encoder 33.

In the meantime, the motion vector of a macro-block generated by the MPEG2 decoder 30 and composed of only P pictures or the parameters such as the macro-block type are supplied to the motion vector converter 32.

The motion vector converter 32 converts the motion vector supplied from the MPEG2 decoder 30 to an MPEG4 motion vector, or the parameters supplied from the MPEG2 decoder 30 to parameters such as an macro-block type.

Figure 6:
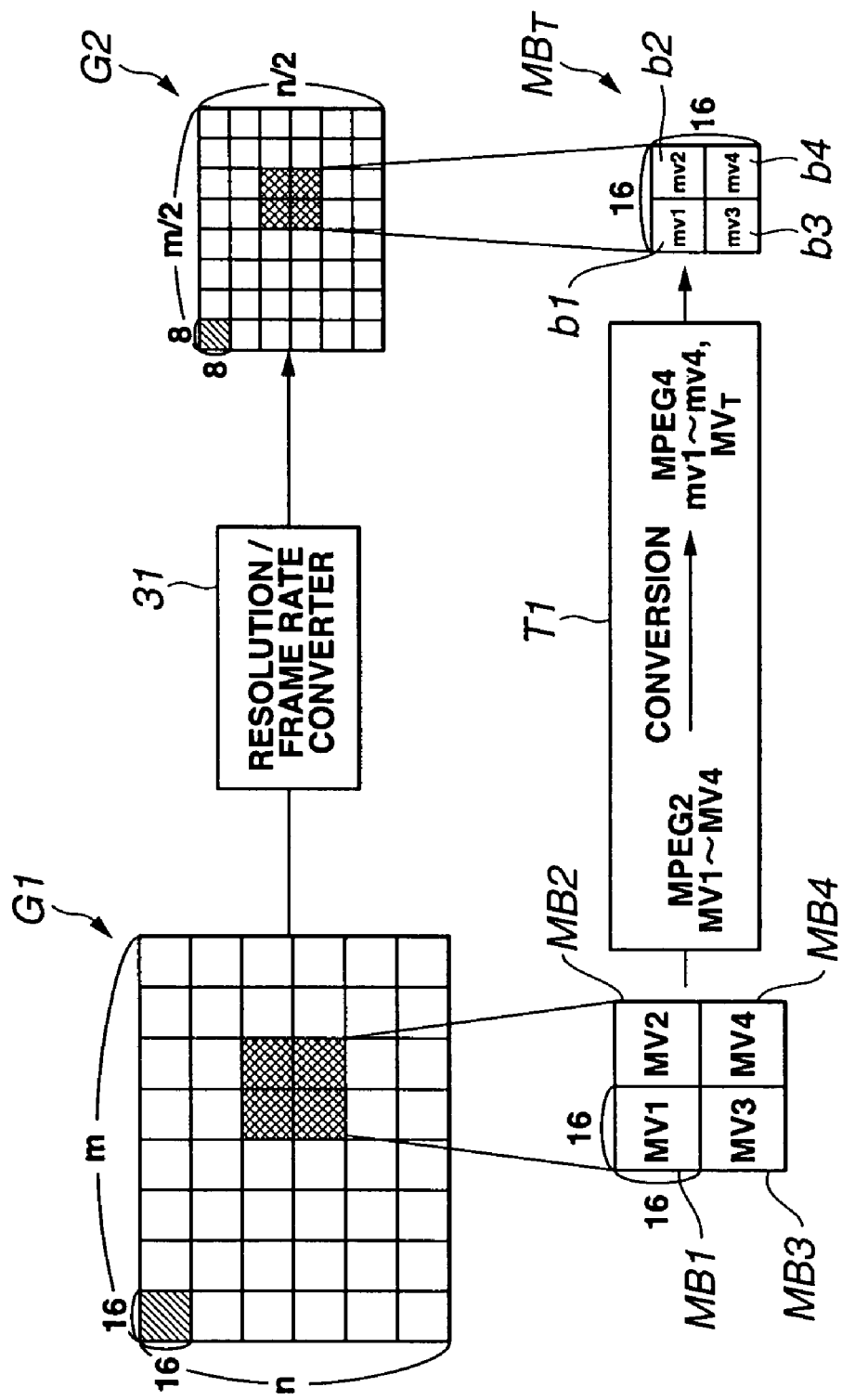
FIG. 6 is a diagram illustrating the principle of converting a motion vector.

The principle of the motion-vector conversion the motion vector converter 32 effects will be explained, with reference to FIG. 6.

The image signal G1 is shown in FIG. 6A. The image signal G2 is shown in FIG. 6B. Each square defined by solid lines indicates a macro block. The image signal G1 shown in FIG. 6A has been output from the MPEG2 decoder 30. (That is, the signal G1 has yet to be subjected to resolution conversion.) The image signal G2 shown in FIG. 6B is generated by the resolution/frame rate converter 31, which decreases the resolution of the image represented by the signal G1 to half the original value, in both the vertical direction and the horizontal direction.

Of the image signal G1 shown in FIG. 6A, which will be subjected to resolution conversion, the upper-left 16×16 pixel macro block will be converted to the upper-left 8×8 macro block of the image signal G2 shown in FIG. 6B. More precisely, the resolution/frame rate converter 31 decreases the resolution of the image signal G1, i.e., m×n pixels (m and n are both multiples of 16), to half the original value in both the vertical direction and the horizontal direction. The image signal G1 is thereby converted to the image signal G2 that represents an image composed of m/2×n/2 pixels as illustrated in FIG. 6B. In this case, four macro blocks MB1 to MB4, included in the image signal G1 and each composed of 16×16 pixels, are converted to four blocks b1 to b4 included in the image signal G2 and each composed of 8×8 pixels. The four blocks b1 to b4 included in the image signal G2 constitute one macro block $MB_T$.

The macro blocks MB1 to MB4, included in the image signal G1 and each composed of 16×16 pixels, have motion vectors MV1 to MV4. Similarly, the macro blocks b1 to b4, included in the image signal G2 and each composed of 8×8 pixels, have motion vectors mv1 to mv4. The motion vectors MV1 to MV4 are greatly correlated with the motion vectors mv1 to mv4. The motion vector converter 32 can therefore effectuate motion-vector conversion T1, finding the motion vectors mv1 to mv4 of the blocks b1 to b4 of the image signal G2, from the motion vectors MV1 to MV4 of the macro blocks MB1 to MB4 included in the image signal G1. Moreover, the converter 32 can obtain the motion vector $MV_T$ of the macro block $MB_T$ composed of the four blocks b1 to b4, from the motion vectors mv1 to mv4 of the blocks b1 to b4.

The motion vector converter 32 that converts motion vectors as indicated above will be described in respect of its structure and operation, with reference to FIG. 7.

Figure 7:
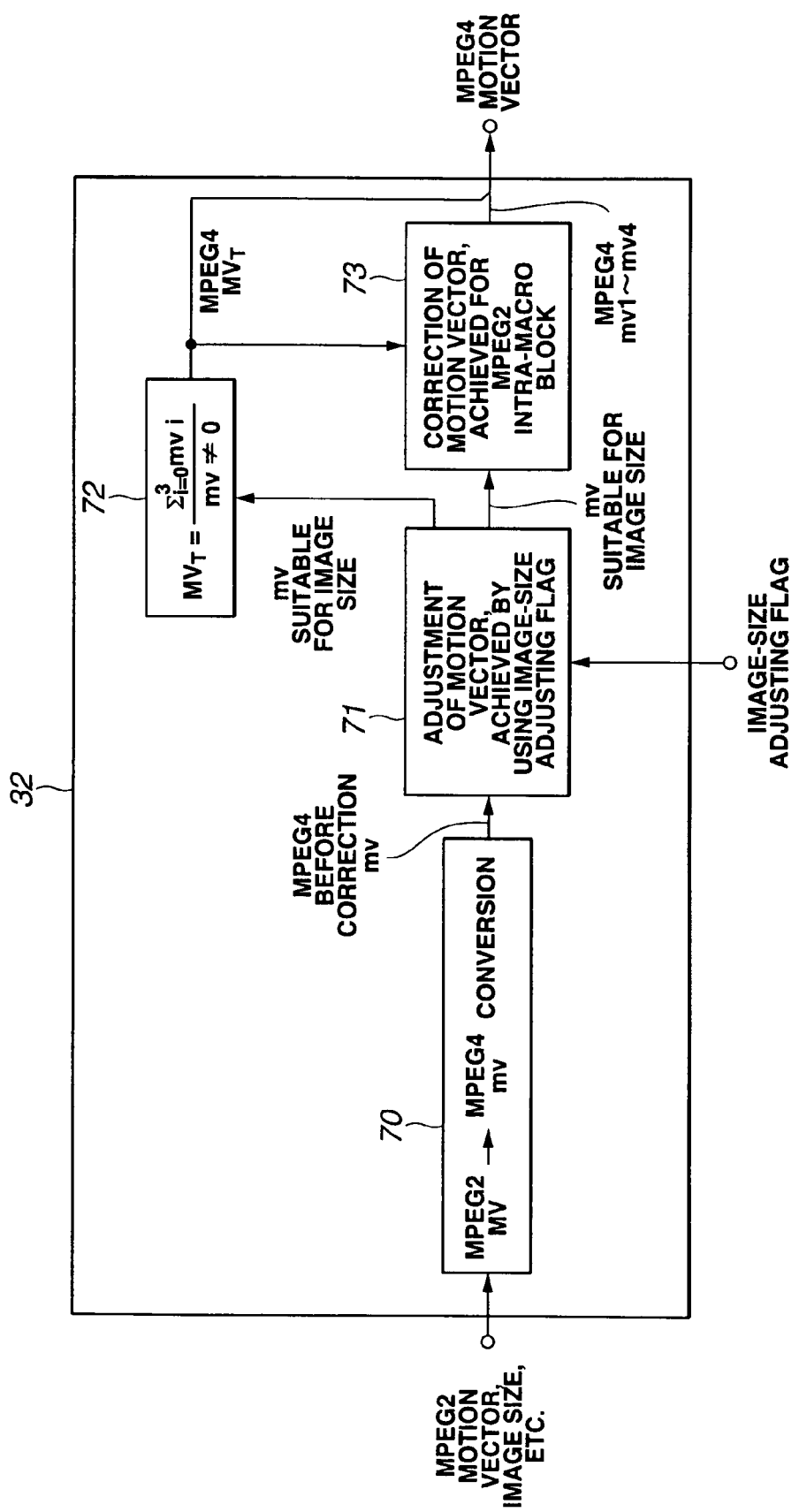
FIG. 7 is a block diagram showing a motion vector converter and explaining the operation of the motor vector converter.

As FIG. 7 shows, the motion vector converter 32 comprises a vector converter 70, a motion vector adjuster 71, an operation section 72, and a motion vector corrector 73. The vector converter 70 receives the motion vector MV of a macro block MB composed of 16×16 pixels, which has been output from the MPEG2 decoder 30 and which can be processed into MPEG3 image codes. The vector converter 70 receives parameters such as the image size, macro-block type and the like, too.

The vector converter 70 generates a motion vector from the motion vector MV of a macro block MB composed of 16×16 pixels and the parameters such as the image size, macro-block type and the like. The motion vector thus generated corresponds to a block composed of 8×8 pixels, the resolution and frame rate of which have been converted.

Figure 8:
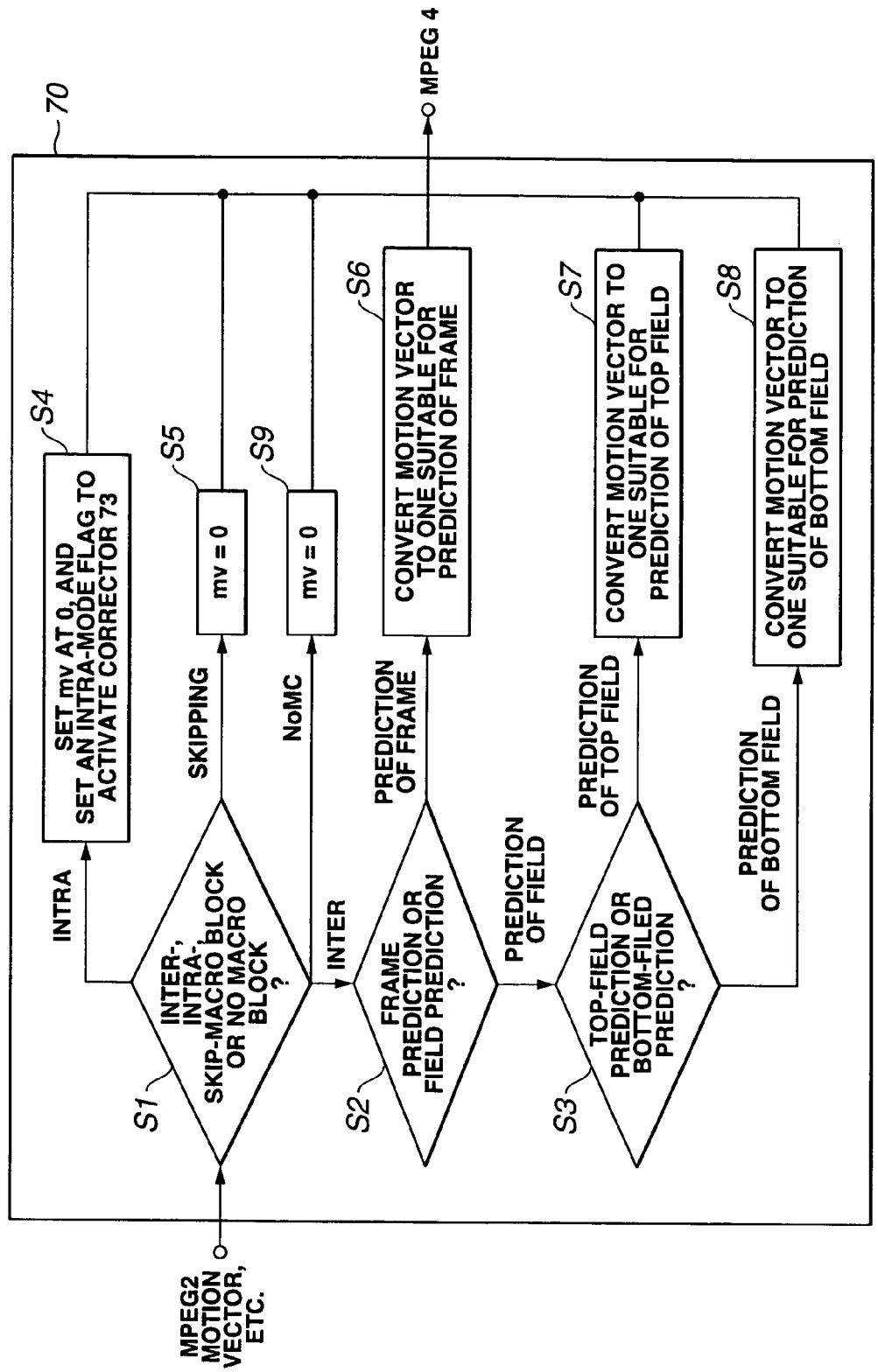
FIG. 8 is a diagram explaining in detail how the vector converter.

How the vector converter 70 operates will be described in detail, with reference to FIG. 8. The vector converter 70 processes the motion vector MV of a macro block MB composed of 16×16 pixels and the parameters such as the image size, macro-block type and the like, as will be explained below. It is assumed here that the vector converter 70 processes MPEG2 image codes of frame structure. This is because most of MPEG2 image codes are of frame structure.

First, in Step S1, the vector converter 70 determines from, for example, the macro-block type, whether the input motion vector MV pertains to an intra-macro block, an inter-macro block, a skip macro block or no MC macro block.

If it is determined in Step S1 that the input vector MV pertains to an intra-macro block, the vector converter 70 performs Step S4. In Step S4 the vector converter 70 sets the value of 0 to the motion vector mv of the 8×8 pixel block that has been subjected to resolution conversion. In Step S4, too, the vector converter 70 sets an intra-mode flag to activate the motion vector corrector 73. It should be noted that the intra-mode flag is set in an MPEG2 image-encoding system to process an intra-macro block.

If it is determined in Step S1 that the input vector MV pertains to a skip macro block, the vector converter 70 performs Step S5. In Step S5 the vector converter 70 sets the value of 0 to the motion vector mv of the 8×8 pixel block that has been subjected to resolution conversion.

If it is determined in Step S1 that the input vector MV pertains to no MC macro block, the vector converter 70 performs Step S9. In Step S9 the vector converter 70 sets the value of 0 to the motion vector mv of the 8×8 pixel block that has been subjected to resolution conversion.

If it is determined in Step S1 that the input vector MV pertains to an inter-macro block, the vector converter 70 performs Step S2.

In Step S2 the vector converter 70 determines whether the 16×16 pixel inter-macro block corresponding the motion vector is one which has frame structure and which should be subjected to frame prediction or one which has frame structure and which should be subjected to field prediction.

If it is determined in Step S2 that the inter-macro block has frame structure and should be subjected to frame prediction, the vector converter 70 performs Step S6. In Step S6 the vector converter 70 converts the motion vector to one that is suitable for frame prediction.

Figure 9:
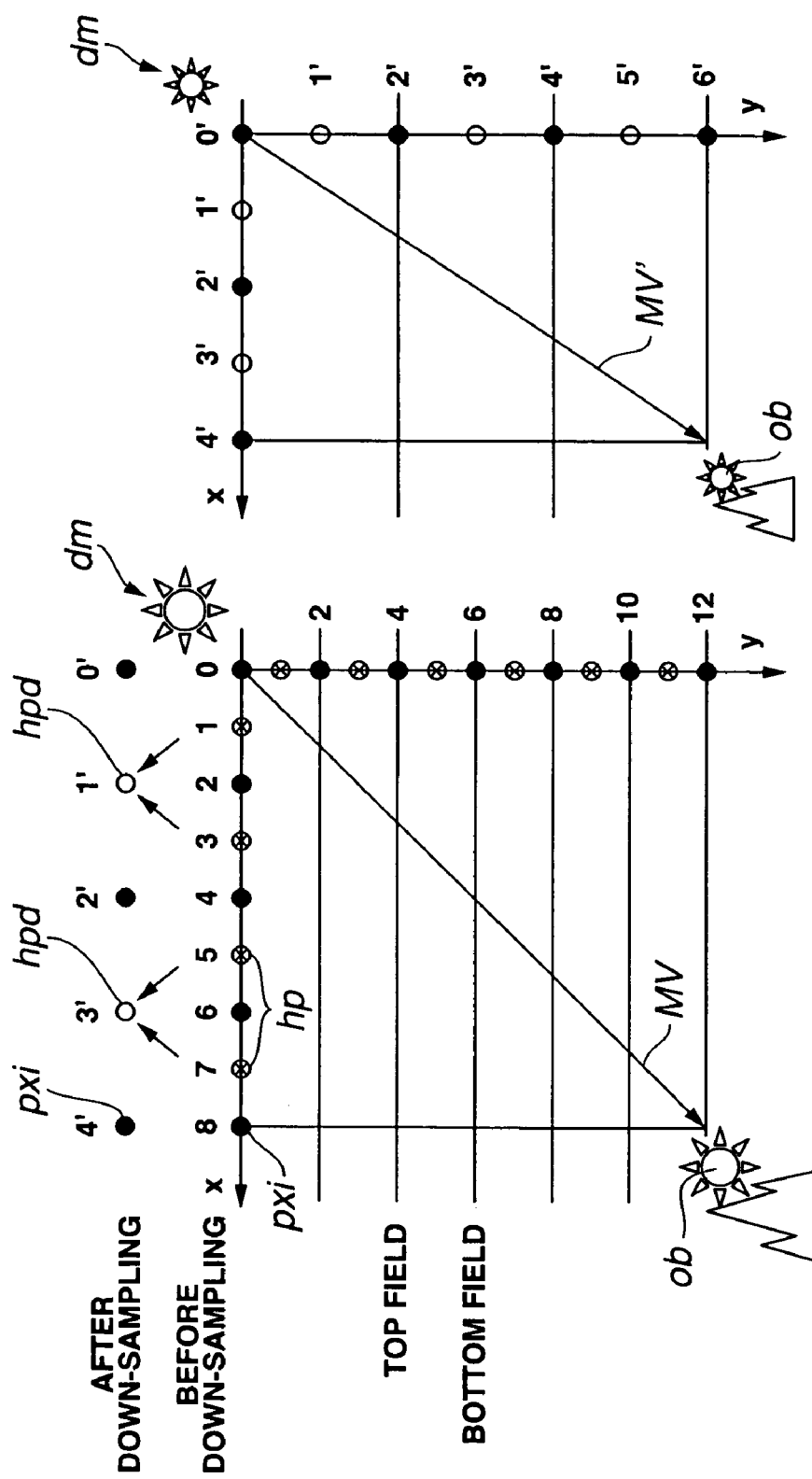
FIG. 9 is a diagram illustrating the concept of the motion vector conversion that the vector converter performs when the inter-macro block has a frame structure and should be subjected to frame prediction.

FIG. 9 illustrates the concept of the motion vector conversion that the vector converter 70 carries out when the inter-macro block has the frame structure and should be subjected to frame prediction. Shown in FIG. 9A is a frame image before the resolution conversion. Shown in FIG. 9B is the frame image after the resolution conversion. In FIG. 9, pxi indicates an integral pixel before the resolution conversion, hp indicates a half pixel before the resolution conversion, and hpd indicates a half pixel after the resolution conversion. In FIG. 9, the horizontal and vertical components of a motion vector MV have the same magnitude of 1 that accords with the half per position of the integral pixel pxi. The magnitudes of the horizontal and vertical components of the motion vector MV shall be called, for brevity, "horizontal component" and "vertical component," respectively.

As described with reference to FIG. 3, the horizontal component of the motion vector subjected to resolution conversion can be obtained from the horizontal component of the motion vector MV the image has before the resolution conversion, and the rate at which the resolution of the image has been converted in the horizontal direction. The vertical component of the motion vector subjected to the resolution conversion can be calculated from the vertical component of the motion vector MV the image has before the resolution conversion, and the rate at which the resolution of the image has been converted in the vertical direction. Thus, if the resolution in the horizontal direction is changed to half, the horizontal component of the motion vector will be half the original value. Similarly, if the resolution in the vertical direction is decreased to half, the vertical component of the motion vector will be half the original value. In the case shown in FIG. 9, the motion vector, which represents the motion of an image from the position dm in the preceding frame to the position of a part ob of the image in the present frame, has a horizontal component of "8" and a vertical component of "12." On the other hand, the motion vector MV' (mv) obtained after the resolution conversion has a horizontal component of "4'" and a vertical component of "6'."

As can be understood from FIG. 9, the components of a motion vector, which are represented by the position of an integral pixel before the resolution conversion, can be represented by the position of an integral pixel or a half pixel even after the resolution conversion. By contrast, the components of a motion vector, which are represented by the position of a half pixel before the resolution conversion, cannot have any corresponding pixel after the resolution conversion.

Hence, the components of any motion vector, which are represented by the position of a half pixel before the resolution conversion, are represented after the resolution conversion by the position of a half pixel of a predicted image. An image signal decoded contains a component distorted due to quantization. The image signal may be used as a predicted image. In this case, however, the prediction efficiency decreases, possibly deteriorating the quality of the image. The image quality may be prevented from deteriorating if linear interpolation is performed on the pixels of a reference image at a ratio of 1:1, thereby raising the accuracy of any half pixel. Thus, if the components of an MPEG2 motion vector represent the position of a half pixel, the MPEG2 motion vector is converted to an MPEG4 motion vector so that the components of the MPEG4 motion vector may represent the position of the half pixel. This enhances the prediction efficiency and prevents deterioration of the image quality.

Table 1, presented below, shows the components that the motion vector has before the motion vector converter 32 converts it and the components that the motion vector has after the motion vector converter 32 converts it.

TABLE 1

Motion vector before conversion, and motion vector after conversion

| Remainder of division of vector MV by 4 | 0 | 1 | 2 | 3 |
|---|---|---|---|---|
| Motion vector after conversion | [MV/2] | [MV/2]+1 | [MV/2] | [MV/2] |

In Table 1, [MV/2] is the integral part of the value obtained by dividing the motion vector by 2.

Referring back to FIG. 8, if it is determined in Step S2 that the inter-macro block has frame structure and should be subjected to field prediction, the vector converter 70 performs Step S3.

In Step S3, the vector converter 70 determines whether the field prediction is top-field prediction or bottom-field prediction.

If the vector converter 70 determines in Step S3 that the field prediction is top-field prediction, it performs Step S7. In Step S7, the vector converter 70 operates as will be described below, thereby converting the motion vector to one that is suitable for top-field prediction.

Figure 10:
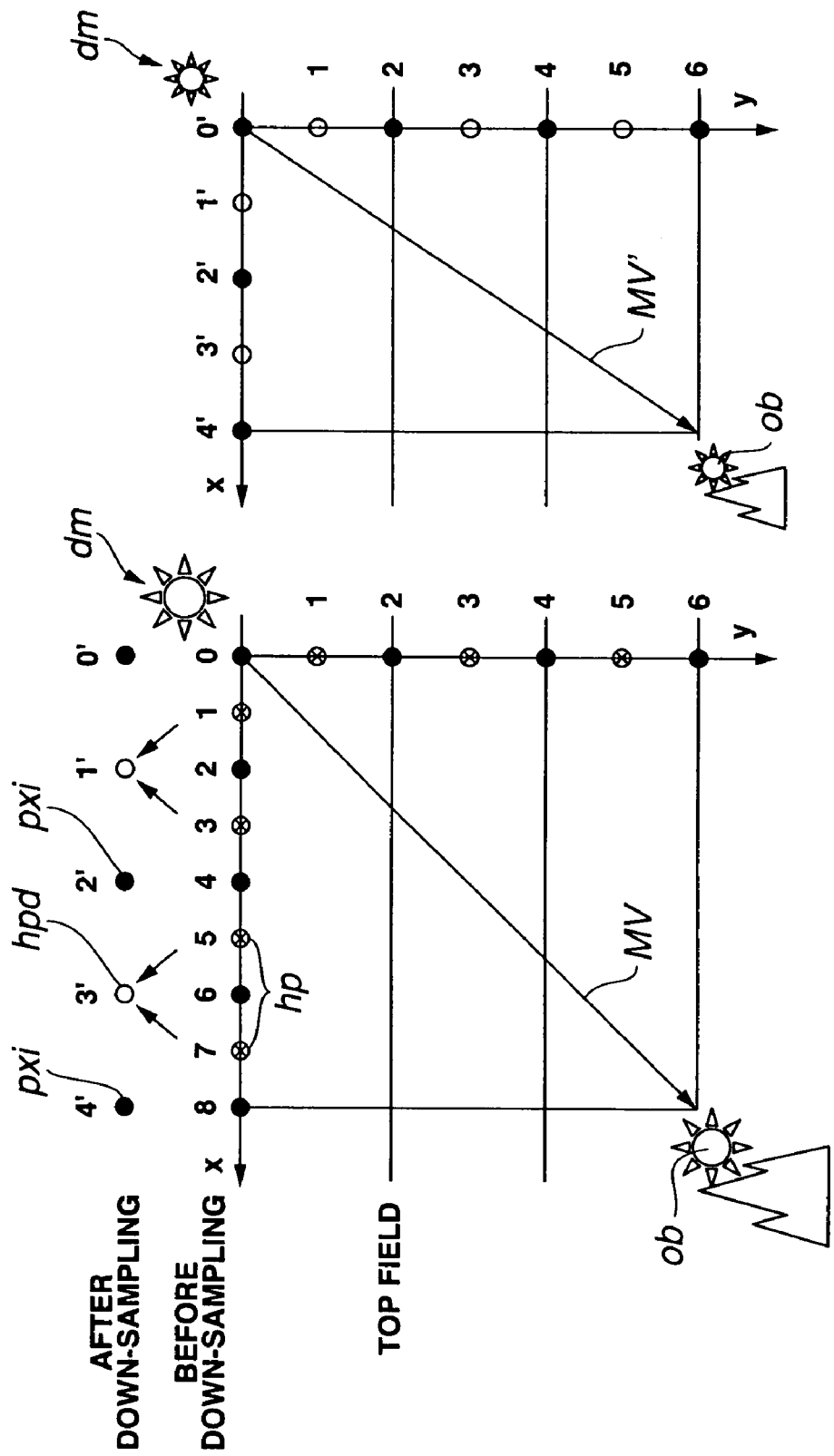
FIG. 10 is a diagram depicting the concept of the motion vector conversion that the vector converter effects to predict a top field.

FIG. 10 depicts the concept of the motion vector conversion that the vector converter 70 effects if it is determined in Step S3 that the field prediction is top-field prediction. Shown in FIG. 10A is a frame image before the resolution conversion. Shown in FIG. 10B is the frame image after the resolution conversion. In FIG. 10, pxi indicates an integral pixel before the resolution conversion, hp indicates a half pixel before the resolution conversion, and hpd indicates a half pixel after the resolution conversion. In FIG. 10, the horizontal and vertical components of a motion vector MV have the same magnitude of 1 that accords with the half per position of the integral pixel pxi.

The horizontal component of the motion vector is converted as is shown in Table 1. Only top fields are extracted, whereby the resolution is changed to half the original value. Since top-field prediction is carried out, the vertical component of the motion vector is not changed at all. In other words, the vertical component the motion vector has before the resolution conversion is used as the vertical component the motion vector has after the resolution conversion.

If the vector converter 70 determines in Step S3 that the field prediction is bottom-field prediction, it performs Step S8. In Step S8, the vector converter 70 operates as will be described below, thereby converting the motion vector to one that is suitable for bottom-field prediction.

Figure 11:
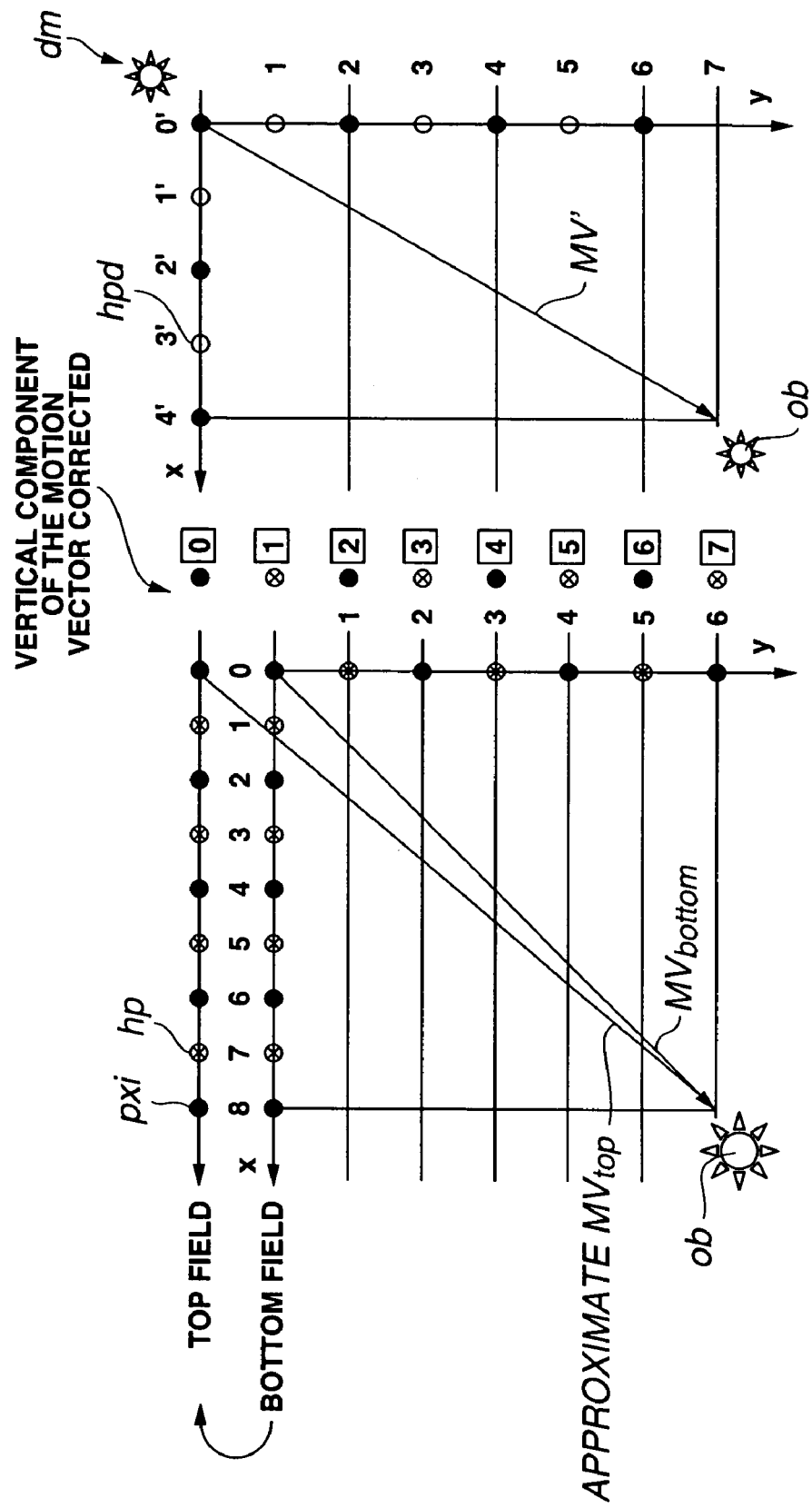
FIG. 11 is a diagram depicting the concept of the motion vector conversion that the vector converter effects to predict a bottom field.

FIG. 11 illustrates the concept of the motion vector conversion that the vector converter 70 effects if it is determined in Step S3 that the field prediction is bottom-field prediction. Shown in FIG. 11A is a frame image before the resolution conversion. Shown in FIG. 11B is the frame image after the resolution conversion. In FIG. 11, pxi indicates an integral pixel before the resolution conversion, hp indicates a half pixel before the resolution conversion, and hpd indicates a half pixel after the resolution conversion. In FIG. 11, the horizontal and vertical components of a motion vector MV have the same magnitude of 1 that accords with the half per position of the integral pixel pxi.

As indicated above, only top fields are extracted in the course of the resolution conversion, and the top fields will be used as a reference image after the resolution conversion is achieved. It is therefore necessary to correct the motion vector in time and space, so that the bottom fields used as a predicted image in the MPEG2 image encoding may be converted to top fields that will be predicted after the resolution conversion. In the case shown in FIG. 11, the motion vector is corrected in time and space to convert the bottom fields to top fields, thereby to conduct top-field prediction in place of bottom-field prediction. To state it more specifically, "1" is added to the vertical component of the motion vector. When "1" is added to the vertical component of the motion vector, which has been obtained by means of bottom-field prediction, the bottom field is moved upwards by one column (or one row) as is seen from FIG. 11. As a result, the bottom field reaches the same spatial position as a top field. The motion vector becomes similar to a motion vector that may be obtained by means of top-field prediction. The vertical component of an approximate motion vector $MV_{top}$, which is acquired when the bottom filed that has reached the same spatial position as the top field is used as a predicted image, is given by the following equation (1):

$$\text{Vertical component: } MV_{top} = MV_{bottom} + 1 \quad (1)$$

Note that it is unnecessary to carry out spatial correction on the horizontal component of the motion vector. The horizontal component needs only to be processed in the same way as in the top-field prediction.

A time lag occurs between the top field and bottom field of an interlace image in the process of MPEG2 image encoding. To eliminate the time lag between the bottom field and the top field generated from the bottom field by means of approximation, the motion vector must be corrected in time.

Figure 12:
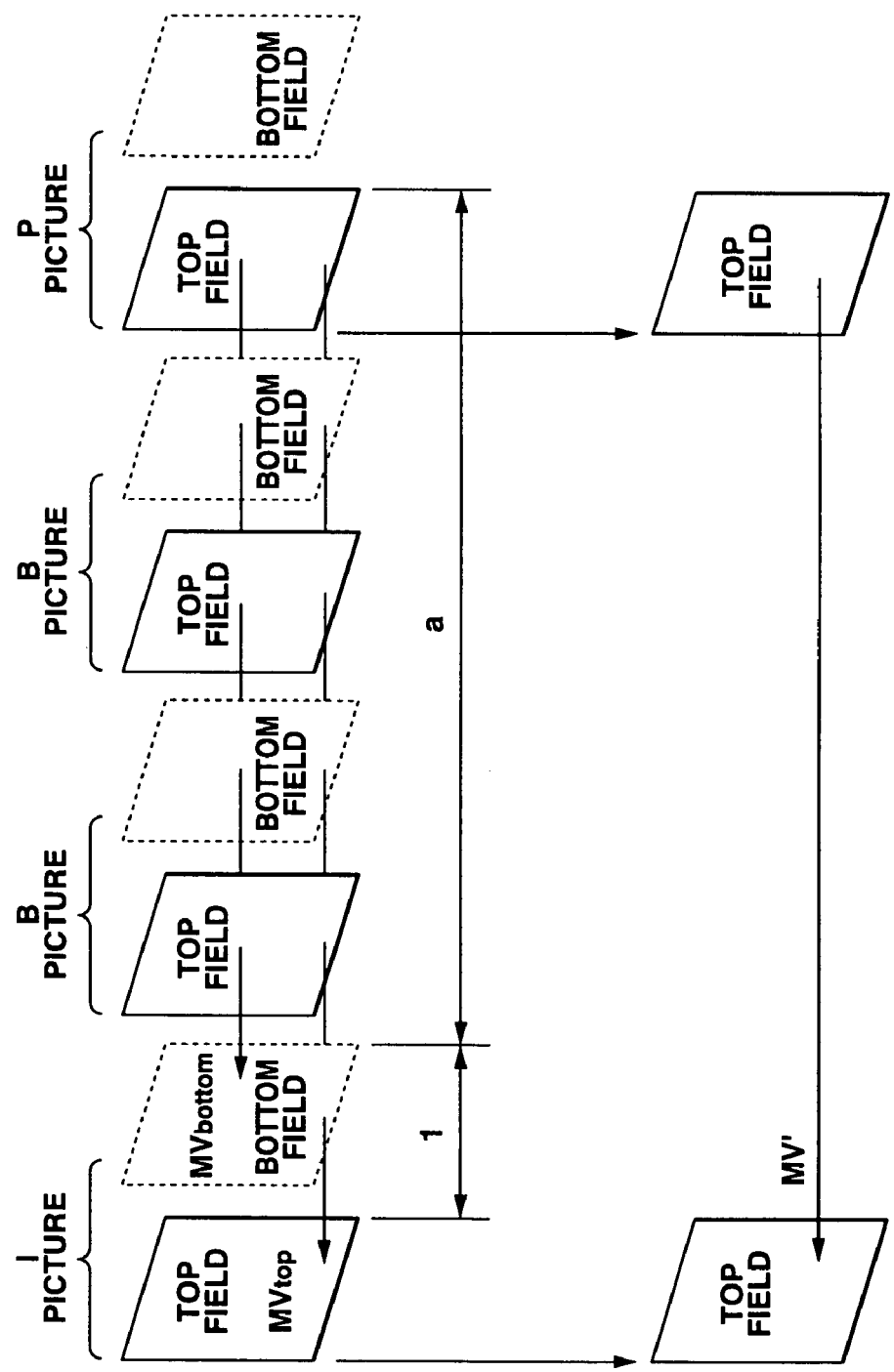
FIG. 12 is a diagram showing how the positional relation between fields changes with time.

FIG. 12 shows how the positional relation between fields changes with time.

As shown in FIG. 12, a time lag of 1 exists between the top field and the bottom field. In FIG. 12, "a" represents the distance between the bottom field of an I picture and the top field of a P picture. The distance "a" is an odd number such as 1, 3, 5, 7, . . . or the like. If the distance "a" is 1, the image will be composed of I, P, P, P, . . . pictures. The vertical component of the motion vector MV' is given as follows after the vector MV' is corrected in terms of time:

$$\text{Vertical component: } MV' = (a+1) \cdot \text{approx. } MV_{top}/a \quad (2)$$

Let us substitute the equation (1) in the equation (2). Then, the vertical component of the motion vector will change to the following, after the motion vector is converted:

$$\text{Vertical component: } MV' = (a+1)(MV_{bottom}+1)/a \quad (3)$$

The horizontal component of the motion vector after the conversion can be obtained by multiplying the motion vector before the conversion with (a+1)/a and correcting the motion vector in time, as can be seen from Table 1.

As mentioned above, the vertical component of the motion vector is subjected to time correction after has been subjected to spatial correction. Nonetheless, the vertical component may be first corrected in time and then in space. In this case, the vertical component of the motion vector is given by the following equation (4). The horizontal component of the motion vector will have the same value, no matter whether it is correct first in space and then in time, or first in time and then in space.

$$\text{Vertical component: } MV' = \{(a+1)/a\}MV_{bottom} + 1 \quad (4)$$

The difference between the values obtained by the equations (3) and (4) is 1/a. Thai is, a difference of 1/a exists between the vertical component found by performing time correction and spatial correction in the order mentioned and the vertical component found by effecting spatial correction and time correction in the order mentioned. Therefore, the influence the difference imposes depends upon the value of "a."

It will be described how the vertical component of the motion vector is corrected when "a" is 1 and how the vertical component is corrected when "a" is greater than 1, namely, 3, 5, 7, . . . or the like.

How to correct the vertical component of the motion vector when "a" is 1 will be explained first.

Substitute 1 for "a" in the equation (3). The vertical component of the motion vector is then given as follows:

$$\text{Vertical component: } MV' = 2 \times (MV_{bottom} + 1) \quad (5)$$

Substituting 1 for "a" in the equation (4), we obtain the following vertical component of the motion vector:

$$\text{Vertical component: } MV' = 2 \times (MV_{bottom} + 1) - 1 \quad (6)$$

As a result, the equation (5) provides a value that is an even number, such as 2, 4, 6, . . . or the like if the motion vector $MV_{bottom}$ has the value of 0, 1, 2, . . . or the like before it is converted. This means that, once the vertical component has been corrected first in space and then in time, it is presented at the position of an integral pixel, no matter whether it is presented at the position of an integral pixel or the position of a half pixel before the motion vector is converted.

If the motion vector $MV_{bottom}$ has the value of 0, 1, 2, . . . or the like before it is converted, the equation (6) provides a value that is an odd number, such as 1, 3, 5, . . . or the like. In other words, once the vertical component has been corrected first in time and then in space, it is presented at the position of a half pixel, no matter whether it is presented at the position of an integral pixel or the position of a half pixel before the motion vector is converted.

Therefore, the vertical component of the motion vector is corrected first in space and then in time in order to present the vertical component at the position of an integral pixel, just the same as before the motion vector is converted.

On the other hand, the vertical component of the motion vector is corrected first in time and then in space in order to present the vertical component at the position of a half pixel, just the same as before the motion vector is converted.

In summary, in the method of correcting the vertical component, wherein "a" is 1 (a=1), the spatial correction and the time correction are alternately performed on the motion vector yet to be converted. Alternatively, the time correction and the spatial correction are effected on the motion vector in the order mentioned, or the spatial correction and the time correction are effected on the motion vector in the order mentioned.

It will now be explained how the vertical component of the motion vector is corrected when "a" is greater than 1 (a≠1), or when "a" is 3, 5, 7, . . . or the like.

If "a" is not 1, that is, if "a" is 3, 5, 7, . . . or the like, the value 1/a, i.e., the difference between the vertical component corrected first in time and then in space and the vertical component corrected first in space and then in time, can be approximated to 0. In this case, it does not matter whether the vertical component is corrected first in space and then in time or first in time and then in space.

Referring to FIG. 7 again, the vector converter 70 converts the motion vector MV of the input macro block MB that is composed of 16×16 pixels as described above, thus generating a block composed of 8×8 pixels. The motion vector mv of the block thus generated is supplied from the vector converter 70 to the motion vector adjuster 71.

The motion vector adjuster 71 receives the image-size adjusting flag from the external device. In accordance with the flag the motion vector adjuster 71 adjusts the motion vector mv of the 8×8 pixel block to a motion vector suitable for the size of the image represented by the 8×8 pixel block. The motion vector mv thus adjusted is output to the motion vector corrector 73 and the operation section 72.

In other words, the motion vector adjuster 71 adjusts the motion vector mv of the 8×8 pixel block in accordance with the image-size adjusting flag supplied from the external device, so that the pixel adder/extractor 35 may add or extract pixels in the resolution/frame rate converter 31. The motion vector adjuster 71 outputs the motion vector mv thus adjusted.

Figure 13:
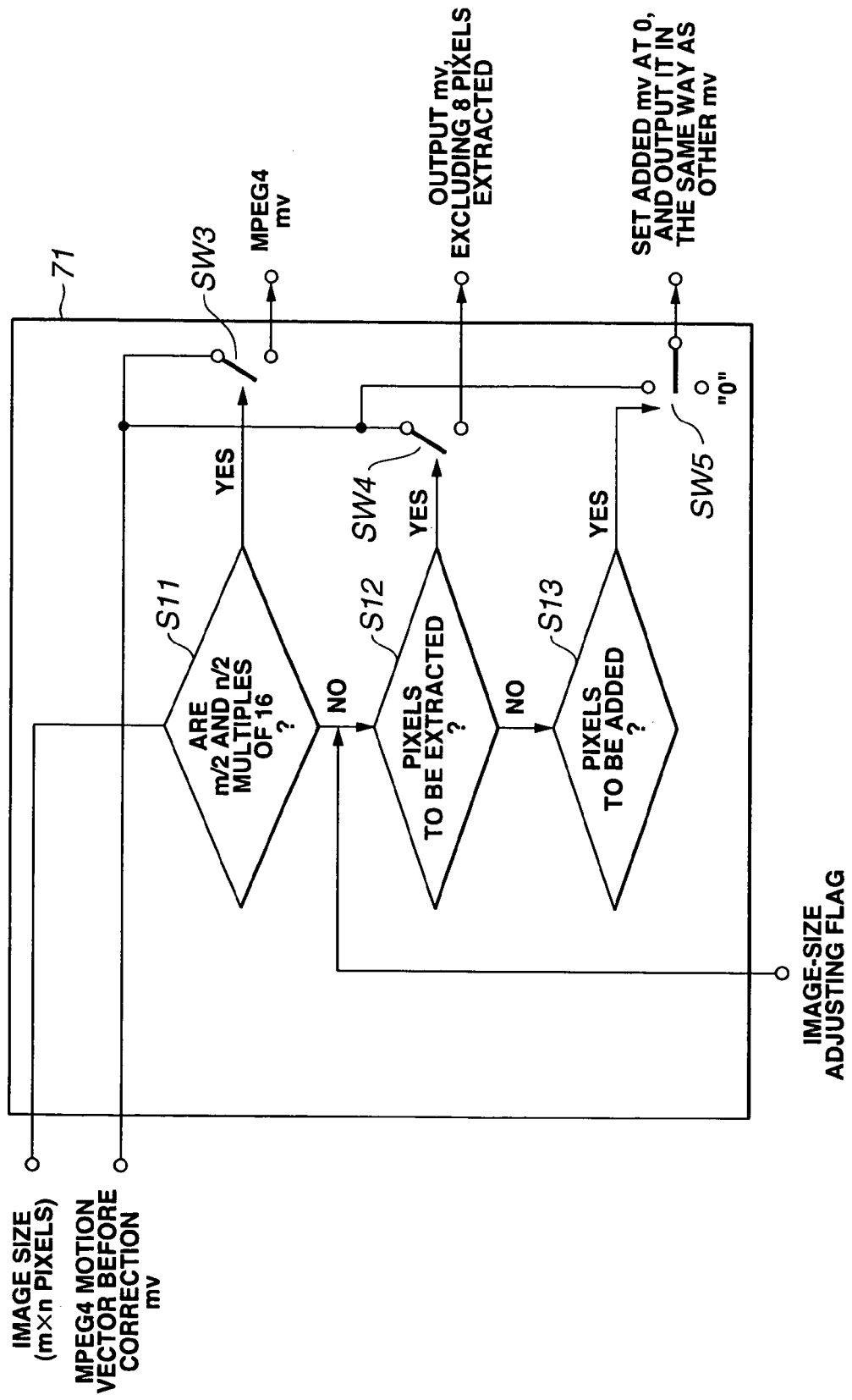
FIG. 13 is a diagram explaining in detail how a motion-vector adjusting section operates.

How the motion vector adjuster 71 performs its function will be described in detail, with reference to FIG. 13.

The motion vector adjuster 71 receives the data representing the size of the image input. From this data the motion vector adjuster 71 determines in Step S11 whether the image output from the MPEG2 decoder 30 has a resolution of m×n pixels and whether the m/2 pixels arranged in each column and n/2 pixels arranged in each row are both multiples of 16. If it is determined in Step S11 that m/2 pixels and the n/2 pixels are both multiples of 16, the switching section SW3 is turned on, outputting the MPEG4 motion vector mv (not corrected yet) that has been supplied from the motion vector converter 32. If it is determined in Step S11 that both m/2 pixels and the n/2 pixels are not multiples of 16 (that is, if there is a remainder of 8 pixels), the motion vector adjuster 71 performs Step S12.

In Step S12, the motion vector adjuster 71 determines, from the image-size adjusting flag, whether eight pixels (i.e., the remainder of the division by 16, which the resolution/frame rate converter 31 has performed) have been extracted or not. If YES, the switching section SW4 is turned on. In this case, the motion vector adjuster 71 outputs the motion MPEG4 vector mv of each block b, which does not corresponds to the eight pixels that have been extracted. If NO in Step S12, the motion vector adjuster 71 carries out Step S13.

In Step S13, the motion vector adjuster 71 controls the switching section SW5 in accordance with the image-size adjusting flag. The motion vector mv of each block b that corresponds to the eight pixels added in the resolution/frame rate converter 31 is thereby set at "0." (That is, the movable contact of the switching section SW5 is connected to the "0" stationary contact.) A motion vector of "0" is thereby output for the eight pixels added, from the motion vector adjuster 71. The motion vector adjuster 71 outputs the motion vectors mv of the other blocks b, without processing them at all.

Referring back to FIG. 7, the motion vector mv thus adjusted by the motion vector adjuster 71 is supplied to the operation section 72 and the motion vector corrector 73.

The operation section 72 performs the operation of the following equation (7) by using the motion vector mv, thereby obtaining an MPEG4 motion vector MVT for a 16×16 pixel macro block MBT that consists of four 8×8 pixel blocks b having motion vectors mv1 to mv4, respectively.

$$MV_T = \begin{cases} 0 & \text{if the four blocks are all intra-blocks} \\ \dfrac{\sum_{i=0}^{3} mvi}{\text{No. of } mv \neq 0} & \text{if at least one of the four blocks is an inter-block} \end{cases}$$

That is, the operation section 72 finds the sum of the motion vectors mv1 to mv4 of the four blocks b1 to b4 converted from a non-intra macro block MB that is one of the four blocks converted from an MPEG2 macro block MB. The sum is divided by the number of blocks that have been converted from a non-intra macro block. The operation section 72 outputs the quotient of the division as the motion vector $MV_T$ of the 16×16 pixel macro block $MB_T$ that accords with the MPEG4 image encoding. The MPEG4 motion vector $MV_T$ of the 16×16 pixel macro block $MB_T$ may be determined from the mean weight applied to the DCT coefficient of the motion vector mv of the 8×8 pixel block b.

The MPEG4 motion vector $MV_T$ output from the operation section 72 is supplied to the motion vector corrector 73.

The motion vector corrector 73 receives any one of the motion vectors mv of the 8×8 pixel blocks b supplied from the motion vector adjuster 7, that corresponds to a MPEG2 intra-macro block. The motion vector corrector 73 replaces the motion vector mv with the motion vector MVT the operation section 72 has found for the 16 ×16 pixel macro block $MB_T$.

Figure 14:
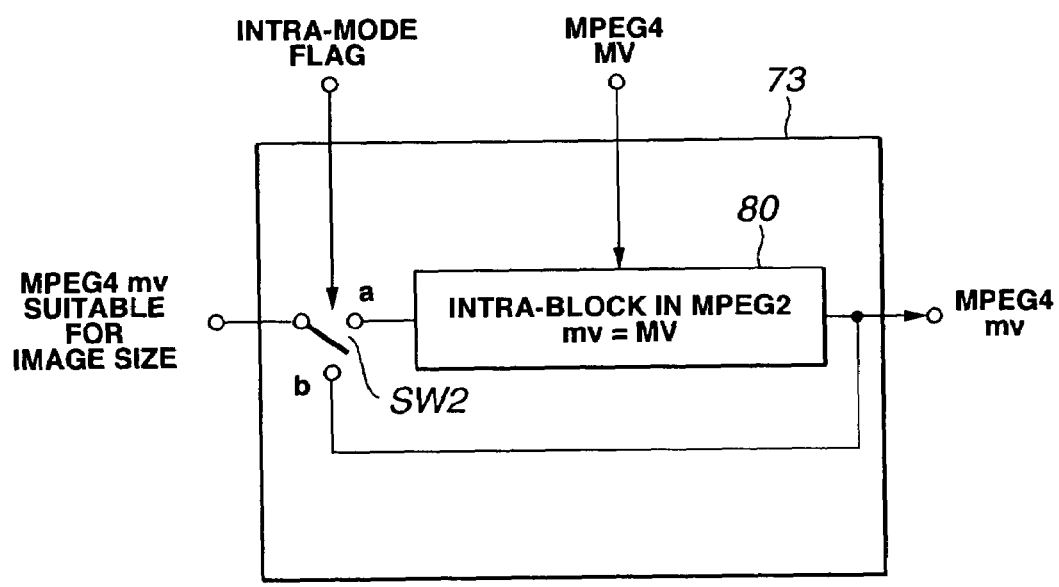
FIG. 14 is a diagram explaining in detail how a motion vector corrector operates.

FIG. 14 illustrates the structure of the motion vector corrector 73 in detail.

As shown in FIG. 14, the motion vector corrector 73 comprises a switch SW2 and a vector-replacing section 80. The switch SW2 has a movable contact and two stationary contacts a and b. The switch SW2 receives the motion vector mv of an 8 ×8 pixel block b which has been output from the motion vector adjuster 71 and which accords with the image size. An infra-mode flag is supplied to the switch SW2. In accordance with the infra-mode flag the movable contact of the switch SW2 is connected to either the first stationary contact a or the second stationary contact b.

If the infra-mode flag is set, indicating that the input motion vector mv corresponds to an MPEG2 intra-macro block, the movable contact will be connected to the first stationary contact a. The motion vector mv is thereby supplied to the vector-replacing section 80.

The vector replacing section 80 receives the motion vectors mv1 to mv4 of the four 8×8 pixel blocks b1 to b4 converted from the MPEG2 intra-macro block. The section 80 also receive the motion vector $MV_T$ of the 16×16 pixel macro block $MB_T$ which has been generated by the operation section 72 and which accords with the MPEG4 image encoding. The section 80 replaces the motion vectors mv1 to mv4 with the motion vector $MV_T$. The MPEG4 motion vector is output from the vector replacing section 80. Alternatively, the motion vectors mv1 to mv4 may be replaced by a motion vector converted from the motion vector of an inter-macro block located near the intra-macro block or by a motion vector converted from the inter-macro block located nearest the intra-macro block. Further, the motion vector may be "0." If the motion vectors of the four 8×8 pixel intra-macro blocks b1 to b4 have been converted from intra-macro blocks, they will be "0." In this case, the motion vector $MV_T$ of the 16×16 pixel macro block $MB_T$ is "0," too. The motion vector for use in the MPEG4 image encoding is therefore "0," and the macro block changes to an intra block.

If the infra-mode flag is not set, indicating that the input motion vector mv does not correspond to an MPEG2 intra-macro block, the movable contact is connected to the second stationary contact b. In this case, the input motion vector mv of the 8×8 pixel block b is output from the motion vector corrector 73.

Referring back to FIG. 7, the motion vectors mv1 to mv4 of the 8×8 pixel blocks b1 to b4, which have been output from the motion vector corrector 73, are output, together with the motion vector $MB_T$ that consists of 8×8 pixel blocks b1 to b4, which have been generated by the operation section 72. The motion vectors mv1 to mv4 and the motion vector $MB_T$ are supplied to the MPEG4 image encoder 33 shown in FIG. 2.

The MPEG4 image encoder 33 performs MPEG4 image encoding on the image data output from the resolution/frame rate converter 31, by using the MPEG4 motion vector output from the motion vector converter 32. As a result, the MPEG4 image encoder 33 generates a bit stream of MPEG4 image codes.

As has been described above, the first embodiment of the invention converts a bit stream of MPEG2 image codes to a bit stream of MPEG4 image codes. Nonetheless, the present invention is not limited to the first embodiment. Rather, the invention can be applied to an apparatus that converts an input image signal to an image signal of the same format as the input image signal. Moreover, the invention can be applied to an apparatus that converts an input image signal to an image signal having a resolution and frame rate different from those of the input image signal.

Figure 15:
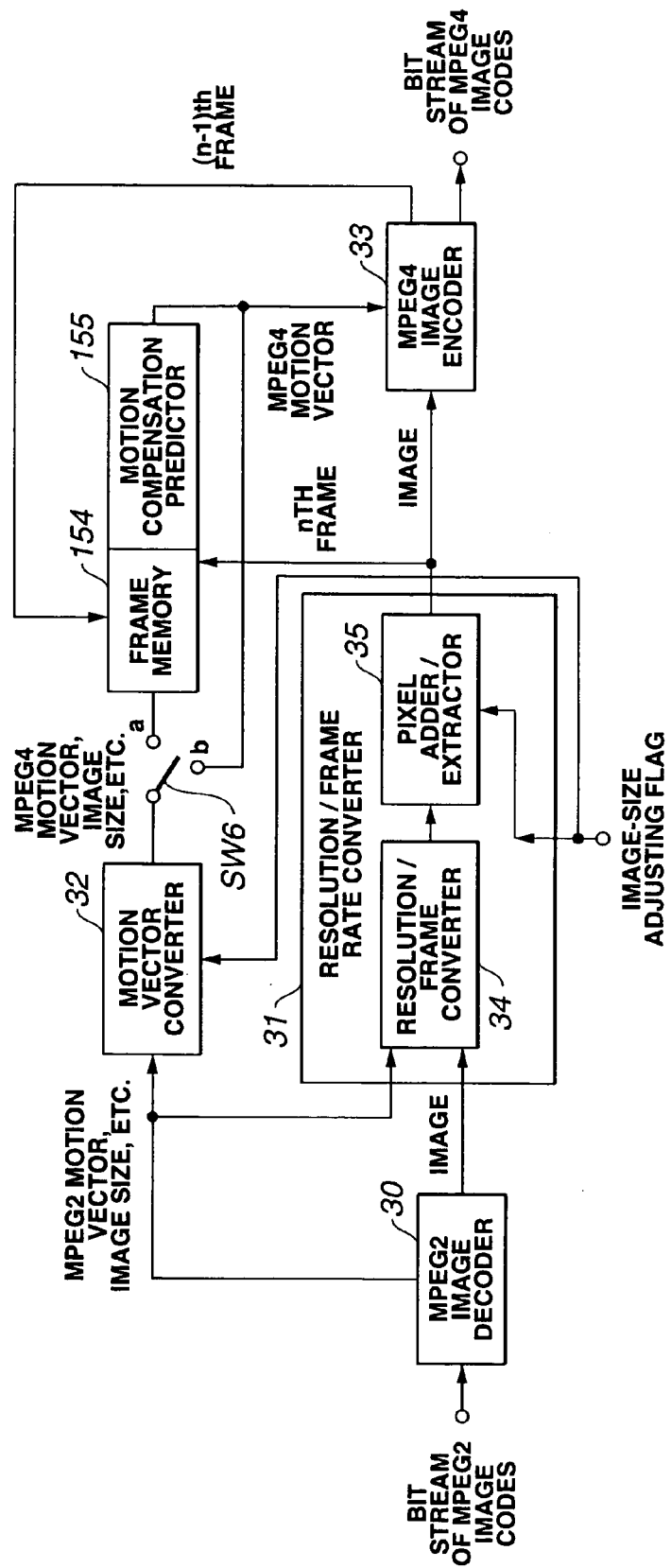
FIG. 15 is a block diagram showing the second embodiment of this invention.

FIG. 15 shows an image-coding format converting apparatus that is the second embodiment of this invention. The components identical or similar to those of the first embodiment (FIG. 2) are designated at the same reference numerals in FIG. 15 and will not be described in detail.

The image-coding format converting apparatus shown in FIG. 15, i.e., the second embodiment, is identical in basic structure to the first embodiment that is shown in FIG. 2. The MPEG2 image decoder 30 decodes the variable-length MPEG2 image codes of the input bit stream and extracts the motion vector of the P picture only and the parameters such as the macro-block type and the like. The motion vector and the parameters are output from the MPEG2 image decoder 30 to the motion vector converter 32. The MPEG2 image codes are decoded and the motion vector and parameters are extracted in the same way as in the first embodiment shown in FIG. 2. The second embodiment comprises a switch SW6, a frame memory 154 and a motion compensation predictor 155. The switch SW6 is connected to the output of the motion vector converter 32 and to the input of the frame memory 154. The motion compensation predictor 155 is connected to the output of the frame memory 154.

The switch SW6 comprises a movable contact and two stationary contacts a and b. The movable contact is connected to the output of the motion vector converter 32. The first stationary contact a is connected to the frame memory 154. The second stationary contact b is connected to the MPEG4 image encoder 33. The movable contact of the switch SW6 is connected to the first stationary contact a only when the motion vectors mv1 to mv4 of four 8×8 pixel MPEG4 blocks b1 to b4, output from the motion vector converter 32, correspond to an MPEG2 infra-macro block.

When the movable contact is connected to the second stationary contact b, the apparatus operates in the same manner as the apparatus illustrated in FIG. 2.

When the movable contact of the switch SW6 is connected to the first stationary contact a, the MPEG4 motion vector mv output from the motion vector converter 32, the image signal that has been output from the resolution/frame rate converter 31, and the image signal corresponding to the bit stream output from the MPEG4 image encoder 33 are stored into the frame memory 154.

In the second embodiment, the motion vector of the 16×16 pixel macro block and the motion vector of the 8×8 pixel block are detected before they are supplied to the MPEG4 image encoder 33. Therefore, of the image signal stored in the frame memory 154, the image signal supplied from the resolution/frame rate converter 31 represents the present frame image, and the image signal supplied from the MPEG4 image encoder 33 represents a prediction-reference frame image. The motion compensation predictor 155 uses the present frame image and the prediction-reference frame image, thereby detecting an MPEG4 motion vector that pertains to these frame images. The prediction-reference frame image may be represented by an image signal output from the resolution/frame rate converter 31. Further, the image signals output from the resolution/frame rate converter 31 may alternately represent the present frame image and the prediction-reference frame image. The MPEG4 motion vector output from the motion compensation predictor 155 is supplied to the MPEG4 image encoder 33.

Figure 16:
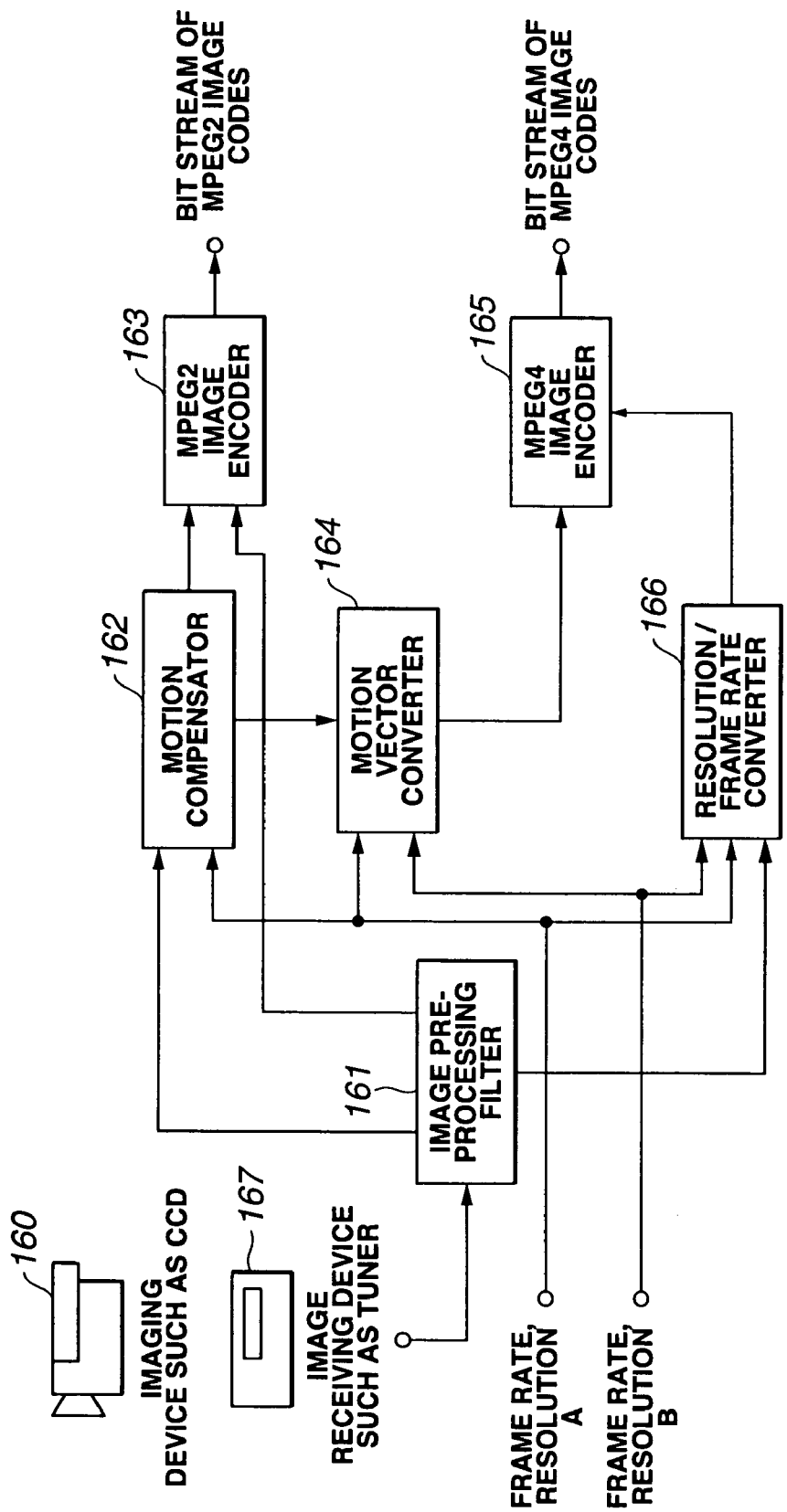
FIG. 16 is a block diagram illustrating the third embodiment of the present invention.

FIG. 16 shows an image-coding format converting apparatus that is the third embodiment of the present invention.

As illustrated in FIG. 16, this image-coding format converting apparatus comprises an image pre-processing filter 161, a motion compensator 162, an MPEG2 image encoder 163, a motion vector converter 164, an MPEG4 encoder 165, and a resolution/frame rate converter 166. The image pre-processing filter 161 receives an image signal from an imaging device 160 or an image-receiving device 167. The imaging device 160 has, for example, a CCD (solid-state imaging element). The image-receiving device 167 is, for example, a tuner or the like. The image pre-processing filter 161 performs, if necessary, pre-processing on the input image signal, thereby removing noise from the image signal. The image signal is supplied from the image pre-processing filter 161 to the motion compensator 162, MPEG2 image encoder 163, motion vector converter 164 and resolution/frame rate converter 166. If the image signal need not be pre-processed at all, the image pre-processing filter 161 can be disposed of.

The motion compensator 162 receives frame-rate/resolution data A from an external device. The motion compensator 162 calculates, from the frame-rate/resolution data A, a motion vector of each frame image signal supplied from the image pre-processing filter 161. The motion vector calculated is supplied to the MPEG2 image encoder 163 and motion vector converter 164.

The MPEG2 image encoder 163 encodes the image signal supplied from the image pre-processing filter 161, by using the motion vector output from the motion compensator 162. Thus, the MPEG2 image encoder 163 generates a bit stream of MPEG4 image codes.

The motion vector converter 164 operates in the same way as the motion vector converter 32 incorporated in the first embodiment. The converter 164 converts a motion vector in accordance with the frame-rate/resolution data A supplied from the device, thereby generating a new motion vector. The new motion vector is supplied to the MPEG4 encoder 165.

The resolution/frame rate converter 166 operates in the same way as the resolution/frame rate converter 31 provided in the first embodiment. That is, the resolution/frame rate converter 166 effects resolution/frame rate conversion on the image signal output from the image pre-processing filter 161, in accordance with frame-rate/resolution data A and frame-rate/resolution data B, both supplied from the external device. Thus, the resolution/frame rate converter 166 generates an image signal, which is supplied to the MPEG4 encoder 165.

The MPEG4 encoder 165 receives the image signal generated by the resolution/frame rate converter 166. The MPEG4 encoder 165 encodes the image signal in accordance with the motion vector output from the motion vector converter 164. The encoder 165 generates a bit stream of MPEG4 image codes.

In the third embodiment, the motion vector converter 164 is used for one motion compensator 162. The motion vector the motion vector converter 164 generates can be therefore used in both the MPEG2 encoder 163 and the MPEG4 encoder 165. The amount of data processed in the third embodiment is smaller than the amount of data that is processed in the conventional apparatus that needs two motion compensators.

What is claimed is:

1. An apparatus for performing at least resolution conversion on a first signal, thereby generating a second signal, and for generating a third signal from the second signal, said apparatus comprising:

parameter-converting means for generating a second parameter from the second signal based on a first parameter contained in the first signal, wherein the second parameter is required to generate the third signal from the second signal; and signal-generating means for generating the third signal from the second signal by using the second parameter, wherein:

the first signal is a first image signal generated by decoding a first encoded image signal that has been obtained by performing motion prediction on each block composed of a plurality of pixels;

the second signal is a second image signal generated by performing resolution conversion on the first image signal;

the third signal is a third image signal generated by encoding the second signal by means of motion prediction on each block composed of a plurality of pixels; and the parameter-converting means converts the motion vector included in the first parameter, to all or some of motion vectors that are required to generate a third encoded image signal from the second image signal.

2. A method of performing at least resolution conversion on a first signal, thereby generating a second signal, and for generating a third signal from the second signal, said method comprising the steps of:

generating a second parameter from the second signal based on a first parameter contained in the first signal, wherein the second parameter is required to generate the third signal from the second signal; and generating the third signal from the second signal by using the second parameter, wherein:

the first signal is a first image signal generated by decoding a first encoded image signal that has been obtained by performing motion prediction on each block composed of a plurality of pixels;

the second signal is a second image signal generated by performing resolution conversion on the first image signal;

the third signal is a third image signal generated by encoding the second signal by means of motion prediction on each block composed of a plurality of pixels; and in the step of generating the second parameter, the motion vector that is included in the first parameter is converted to all or some of motion vectors that are required to generate a third encoded image signal from the second image signal.

* * * * *